Figure 2:
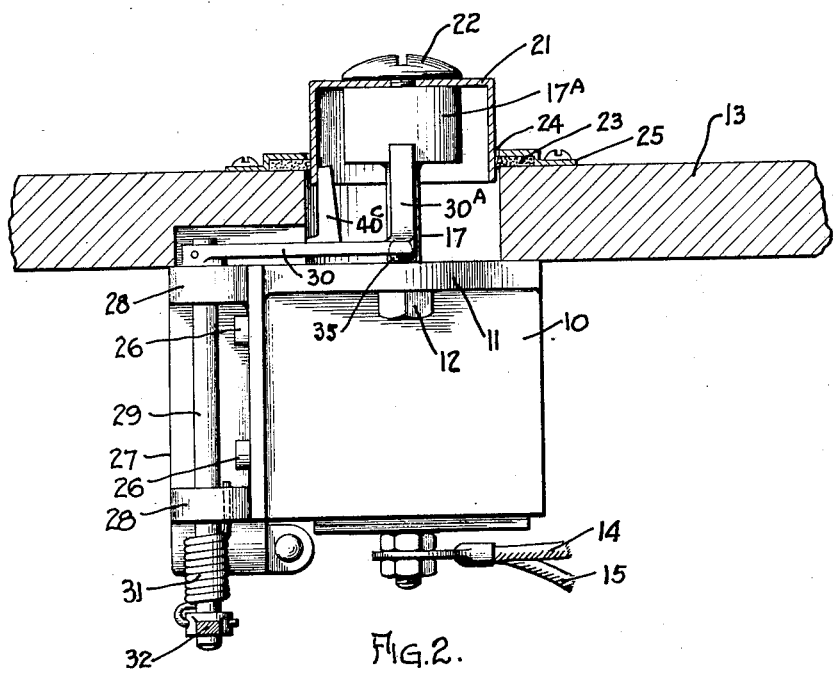

Oct. 19, 1926.

J. HAJEK 1,603,766

AUTOMOBILE STARTING SWITCH

Filed Dec. 5, 1924

2 Sheets-Sheet 1

INVENTOR
Joseph Hajek
BY
Frank J Schraeder Jr
Attorney

Oct. 19, 1926.

J. HAJEK 1,603,766

AUTOMOBILE STARTING SWITCH

Filed Dec. 5, 1924

2 Sheets-Sheet 2

INVENTOR
Joseph Hajek
BY
Frank J Schraeder Jr
Attorney

Patented Oct. 19, 1926.

1,603,766

UNITED STATES PATENT OFFICE.

JOSEPH HAJEK, OF GROVETON, PENNSYLVANIA.

AUTOMOBILE STARTING SWITCH.

Application filed December 5, 1924. Serial No. 754,070.

This invention relates to improvements in automobile engine starting switches and has among its objects to provide a new and useful switch which will automatically retard the ignition apparatus and thus prevent the possibility of the stripping of flywheel teeth or bending of the starting motor shaft.

Another object of the invention is to provide a novel starting switch which is so constructed and arranged that the same is inoperative to close the circuit to the starting motor and battery, during the operation of the engine. This arrangement and provision eliminates the frequent and costly replacement of parts often damaged by misuse of the starter under the aforesaid conditions.

A further object of the invention is the provision of a starting switch of the above described character which shall be simple in construction, adaptable for installation on modern automobiles, and which shall be efficient and positive in operation.

With these and other objects in view my invention consists in the novel combination, construction, and relative position of the parts and members, illustrated in the accompanying drawings, described in the following specifications and particularly pointed out in the appended claims.

Figure 1:
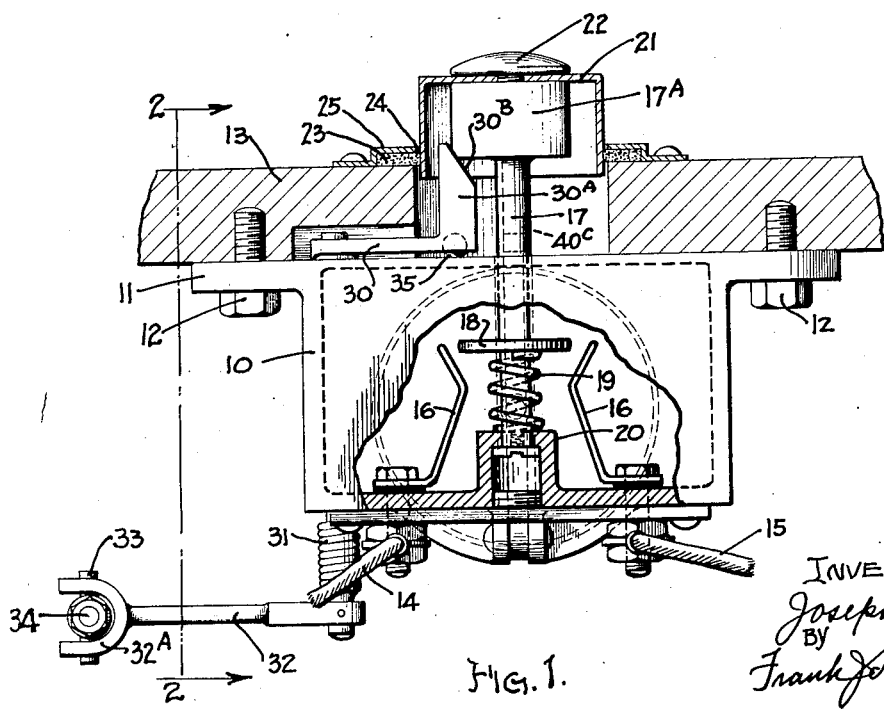
Figure 3:
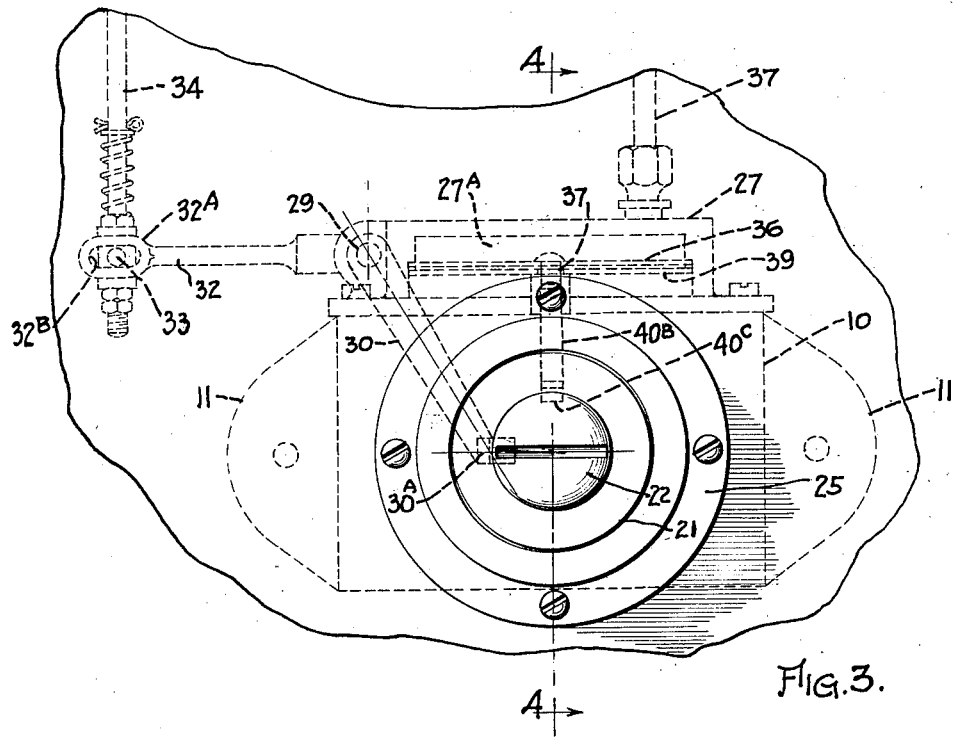
Figure 4:
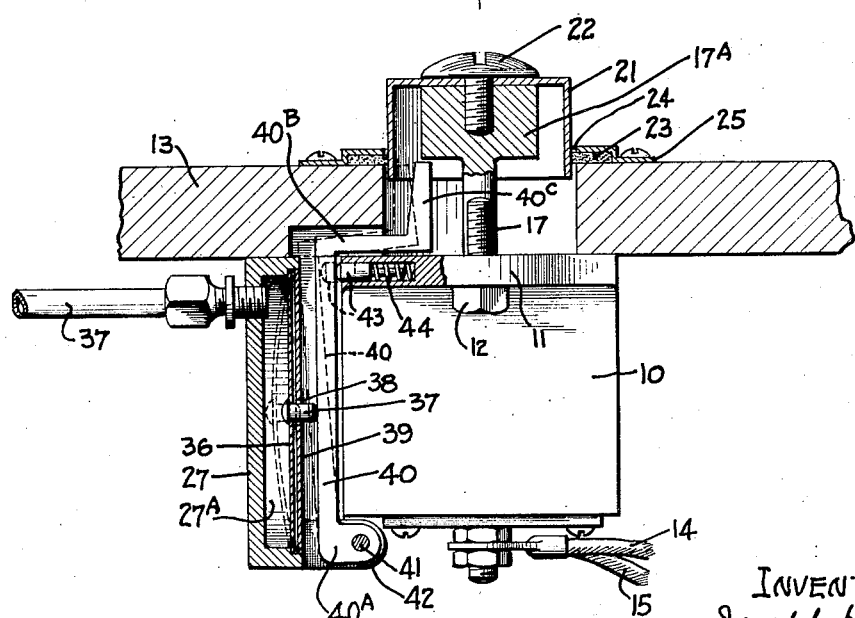

Referring to the drawings which illustrate one embodiment of my invention and in which like reference characters denote like or corresponding parts:

Figure 1 is a side elevation of an automobile starting switch embodying my invention, the switch plunger cap being in section, Figure 2 is an end elevation of same taken on line 2—2 of Figure 1, Figure 3 is a plan view of the switch corresponding to Figure 1, Figure 4 is a cross section taken on line 4—4 of Figure 3, but with the switch housing in end elevation.

Referring to the illustrations 10 indicates a switch housing which is provided with integral ears 11 through which the screws 12 extend for securing of the housing to the floor board 13. Within the housing 10 is mounted a switch of any suitable plunger type which completes the circuit, between the terminals 14 and 15. I have preferred to show a switch employing a pair of leaf springs 16 which are insulated from the housing 10. The plunger rod 17 carries a collar 18 which is normally held in raised position by the coil spring 19 confined between it and the internal sleeve 20 which is cast with the housing bottom. It is readily apparent that when the plunger cap 21 is foot pressed the collar 18 will engage the springs 16 to complete the electric circuit to operate the starting motor.

The inverted cup cap 21 is concentrically mounted to the plunger head 17$^A$ by a screw 22. A floor felt washer 23 surrounds the cap 21 to prevent dust passing through the opening 24 in the floor board. A trimming plate 25 retains the felt washer 23 in place.

Secured by screws 26 to the side of the switch housing 10, is an oil chamber casing 27 having a pair of vertically aligned integral ears 28 within which I loosely mount the rod 29. The arm 30 is securely mounted to the upper end of the rod 29 and is formed with an integral upstanding end 30$^A$ having a beveled face 30$^B$ which the plunger head 17$^A$ engages in its downward movement and whereby the arm 30 is oscillated outwardly against the pressure of the coil spring 31 wound around its lower end.

Secured to the lower end of the rod 29 is an arm 32 which is provided with a yoke 32$^A$ at its outer end. The yoke ends have lateral slots 32$^B$ in vertical alignment for engagement of the pin 33 carried within the end of the rod 34 which extends to the ignition timing distributing cap for imparting motion thereto to retard the time of the ignition spark. It is obvious that the relative length of the bevel 30$^B$, the length of the arm 32, and the distance of the collar 18 above the point of contact with the springs 16 must be such that the ignition spark mechanism will be moved to retard the spark before the circuit between the springs 16 is completed.

To facilitate the oscillating action of the arm 30 and absorb the downward thrust on the end 30$^A$ by the plunger head 17$^A$, I provide the underside of the end 30$^A$ with a ball bearing 35. It is obvious, that the coil spring 31 will automatically return the arm 30 into normal position and thus advance the time of the ignition spark immediately upon the release of the pressure upon the plunger rod 17.

I will now proceed to describe my improvement for locking the switch to prevent its operation during the time the engine is in operation.

The oil chamber casing 27 is provided with an interior annular oil chamber 27^A which is closed or sealed on the inner side of the casing 27 by a thin flexible steel or brass diaphragm 36. The chamber 27^A is connected by means of the pipe 37^A with the engine oil line which is maintained under pressure during the operation of the engine.

An outwardly projecting pin 37 is secured to the center of the flexible diaphragm 36 and extends through the opening 38 within the center of the comparatively heavy diaphragm 39 which is mounted practically adjacent the diaphragm 36 and the function of which is to positively limit the outward motion of the thin diaphragm 36.

A vertically disposed latch lever 40 having a short lower lateral extension 40^A is pivotally mounted at 41 between the ears 42 cast integrally with the casing 27.

The latch lever 40 is mounted in alignment with the pin 37 with which it is constantly in contact due to the pressure exerted on it by the pin 43 which is mounted in a lateral slot within the top of the switch casing 10 and pressed outwardly by the coil spring 44.

The upper end of the lever 40 is provided with a short lateral integral extension 40^B having the end thereof 40^C bent upwardly and adapted for movement under the head 17^A and as an obstruction for preventing the downward movement of the head 17^A and the plunger 17.

The position of the latch 40 shown by the full lines in Fig. 4, is that assumed under operating conditions of the engine and with the oil pressure in the oil line extended to the chamber 27^A against the diaphragm 36, whereby the lever 40 is moved outwardly against the pressure of the pin 43 with the end 40^C in obstructing position under the plunger head 17^A. It is now readily apparent that when the engine stops running the oil pressure within the line 37^A and chamber 27^A will decline permitting the inward movement of the lever 40 into the position shown by the dotted lines by the pressure of the pin 43. Under this condition only will it be possible to operate the switch.

I claim:

1. In an automobile engine starting switch, the combination of a switch mechanism, a pivoted latch, and means responsive to oil pressure for operating said latch to lock said switch mechanism while the engine is running and to automatically release said latch when the engine is stopped.

2. In an automobile engine starting switch, the combination of a switch mechanism, a pivoted latch, an oil chamber having a flexible diaphragm in operative contact with said latch and adapted to move said latch to lock said switch mechanism in response to oil pressure against said diaphragm, and means for releasing said latch from locking position upon the decline of oil pressure from said diaphragm.

3. In an automobile engine starting switch, and in combination, a switch mechanism having a spring-pressed plunger adapted upon downward pressure to complete an electric circuit, a housing for said switch mechanism, a casing having an oil chamber therein mounted adjacent said mechanism housing, a flexible diaphragm for said oil chamber, pivoted means responsive to the oil pressure against said diaphragm for locking said plunger against downward movement, and resilient means adapted to move said pivoted means out of locking position to release said plunger upon the decline of the oil pressure within said oil chamber.

4. In an automobile engine starting switch, and in combination, a switch mechanism, means adapted for connection to the ignition timing mechanism for automatically retarding same upon movement of said switch mechanism into operative position and said means arranged for automatically advancing the said timing mechanism upon the movement of said switch mechanism into inoperative position, a pivoted latch, and means responsive to oil pressure for operating said latch to lock said switch mechanism while the engine is running and to automatically release said latch when the engine is stopped.

5. In an automobile engine starting switch, and in combination, a switch mechanism, means adapted for connection to the ignition timing mechanism for automatically retarding same upon movement of said switch mechanism into operative position and said means arranged for automatically advancing the said timing mechanism upon the movement of said switch mechanism into inoperative position, a pivoted latch, an oil chamber having a flexible diaphragm in operative contact with said latch and adapted to move said latch to lock said switch mechanism in response to oil pressure against said diaphragm, and means for releasing said latch from locking position upon the decline of oil pressure from said diaphragm.

In witness whereof I affix my signature.

JOSEPH HAJEK.